METHOD AND APPARATUS FOR BENDING TUBES

Filed Sept. 19, 1956 12 Sheets-Sheet 1

INVENTOR.
HENRY V. BOWMAN
BY Moore, White & Burd
ATTORNEYS

April 11, 1961 H. V. BOWMAN 2,979,103

METHOD AND APPARATUS FOR BENDING TUBES

Filed Sept. 19, 1956 12 Sheets-Sheet 2

INVENTOR.
HENRY V. BOWMAN
BY Moore, White & Burd
ATTORNEYS

April 11, 1961 H. V. BOWMAN 2,979,103

METHOD AND APPARATUS FOR BENDING TUBES

Filed Sept. 19, 1956 12 Sheets-Sheet 3

INVENTOR.
HENRY V. BOWMAN
BY Moore, White & Burd
ATTORNEYS

April 11, 1961 H. V. BOWMAN 2,979,103

METHOD AND APPARATUS FOR BENDING TUBES

Filed Sept. 19, 1956 12 Sheets-Sheet 4

INVENTOR.
HENRY V. BOWMAN
BY Moore, White & Burd
ATTORNEYS

April 11, 1961 H. V. BOWMAN 2,979,103

METHOD AND APPARATUS FOR BENDING TUBES

Filed Sept. 19, 1956 12 Sheets-Sheet 5

INVENTOR.
HENRY V. BOWMAN
BY Moore, White & Burd
ATTORNEYS

April 11, 1961 H. V. BOWMAN 2,979,103

METHOD AND APPARATUS FOR BENDING TUBES

Filed Sept. 19, 1956 12 Sheets-Sheet 6

INVENTOR.
HENRY V. BOWMAN
BY Moore, White & Burd
ATTORNEYS

INVENTOR.
HENRY V. BOWMAN
BY Moore, White & Burd
ATTORNEYS

April 11, 1961 H. V. BOWMAN 2,979,103

METHOD AND APPARATUS FOR BENDING TUBES

Filed Sept. 19, 1956 12 Sheets-Sheet 8

INVENTOR.
HENRY V. BOWMAN
BY Moore, White & Burd
ATTORNEYS

INVENTOR.
HENRY V. BOWMAN
BY Moore, White & Burd
ATTORNEYS

METHOD AND APPARATUS FOR BENDING TUBES
Filed Sept. 19, 1956
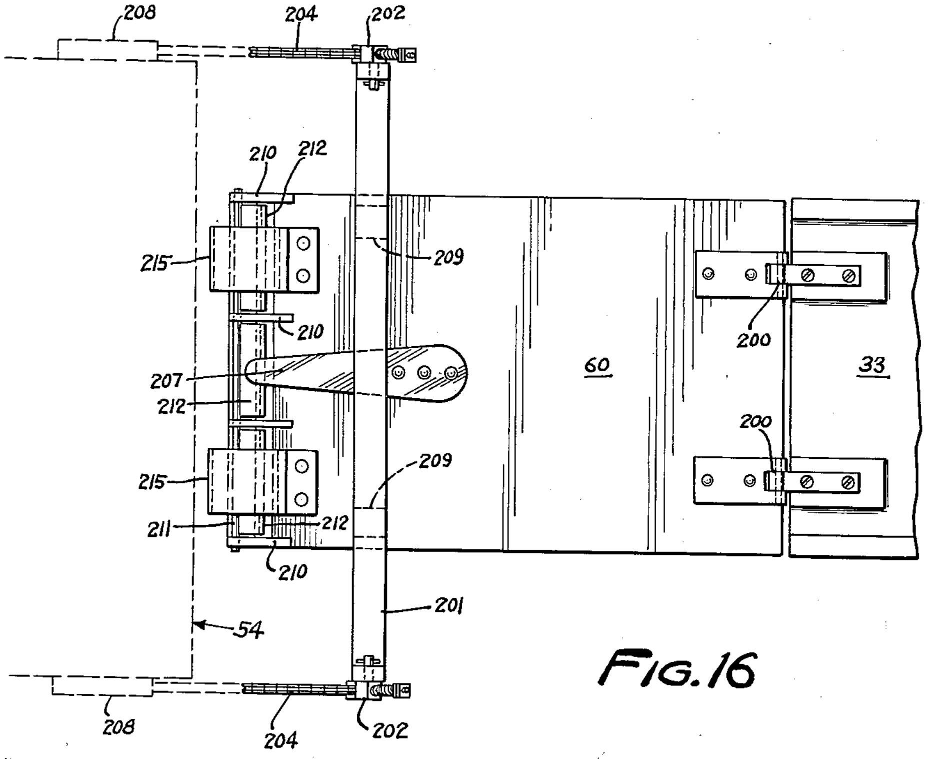
FIG. 16
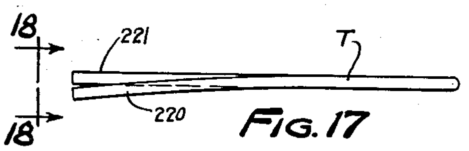
FIG. 17
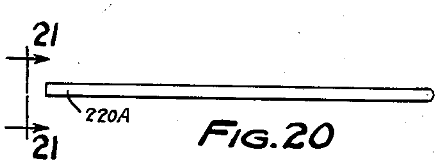
FIG. 20
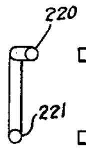
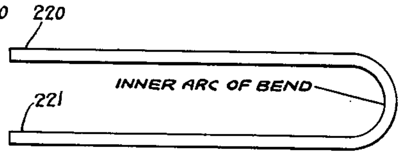
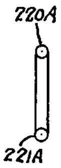
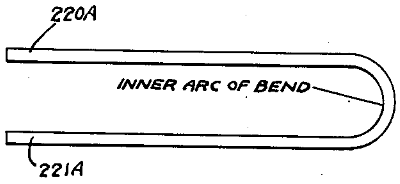
FIG. 18 FIG. 19 FIG. 21 FIG. 22
INVENTOR.
HENRY V. BOWMAN
BY
Moore, White & Burd
ATTORNEYS INVENTOR.
HENRY V. BOWMAN
BY Moore, White & Burd
ATTORNEYS INVENTOR.
HENRY V. BOWMAN
BY Moore, White & Burd
ATTORNEYS United States Patent Office 2,979,103

Patented Apr. 11, 1961

2,979,103

METHOD AND APPARATUS FOR BENDING TUBES

Henry Victor Bowman, 3460 34th Ave. S., Minneapolis, Minn.

Filed Sept. 19, 1956, Ser. No. 610,851

16 Claims. (Cl. 153—40)

This invention relates to new and improved method and apparatus for bending tubes and more particularly relates to method and apparatus for providing hairpin or 180 degree bends in hollow tubing or conduit.

Bent hollow tubing providing a convolute conduit is utilized in many applications such as for example in the construction of air conditioning apparatus where convoluted tubing runs are placed in close proximity with sufficient space between them to permit air circulation therebetween.

While method and apparatus for providing such bent tubing exists there have remained certain difficulties therein.

It is an object of this invention to provide a new and useful method and apparatus for bending tubes having a construction of maximum efficiency, economy, ease of operation and sturdy and dependable characteristics.

A further object of this invention resides in the provision of a method and apparatus for bending tubes or conduits having means for clamping the tubes during bending and for removing the tubes after bending by applying removing force to the inner arcs of the bends by mandrel means rather than applying moving pressure to the ends of the tubes.

It is a further object of this invention to provide a new and useful tube bending method and apparatus wherein fractured ends of the tubes or undesired bending of the tubes are precluded.

It is a further object of this invention to provide new and useful structure in a tube bending machine for removing tubes from the machine.

Still a further object of this invention is to provide a new and useful, tube bending machine in which multiple tubes may be bent simultaneously and accurately.

A further object of this invention is to provide a method and apparatus in which multiple tubes are bent about a horizontal bending axis.

Still a further object of this invention is to provide a method and apparatus for bending tubes wherein floor space is conserved and a finished product of improved quality is provided.

Still a further object of this invention is to provide a new and useful tube bending apparatus insuring aligned tubing ends in a bent tube.

Still a further object of this invention resides in the unique method and apparatus for ejecting or unloading finished bent tubes after bending.

Other and further objects of this invention reside in the specific structural details of the method and apparatus as described, pictured and claimed.

Still other and further objects of the method and apparatus are those apparent and inherent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings in which corresponding numerals refer to the same parts and in which:

Figure 16 is an enlarged bottom plan view of the plate or shelf for supporting bent tubes during ejection;

Figure 17 is an elevational view of a tube bent about a vertical axis and showing the misalignment of the ends produced thereby;

Figure 18 is a view taken along the line and in the direction of the arrows 18—18 of Figure 17;

Figure 19 is a plan view of a tube so bent;

Figure 20 is a view of a tube bent around a horizontal axis according to the method and apparatus of this invention, and showing alignment of ends produced thereby;

Figure 21 is a view taken along the line and in the direction of the arrows 20—20 thereof;

Figure 22 is a plan view thereof; and

Figure 1:
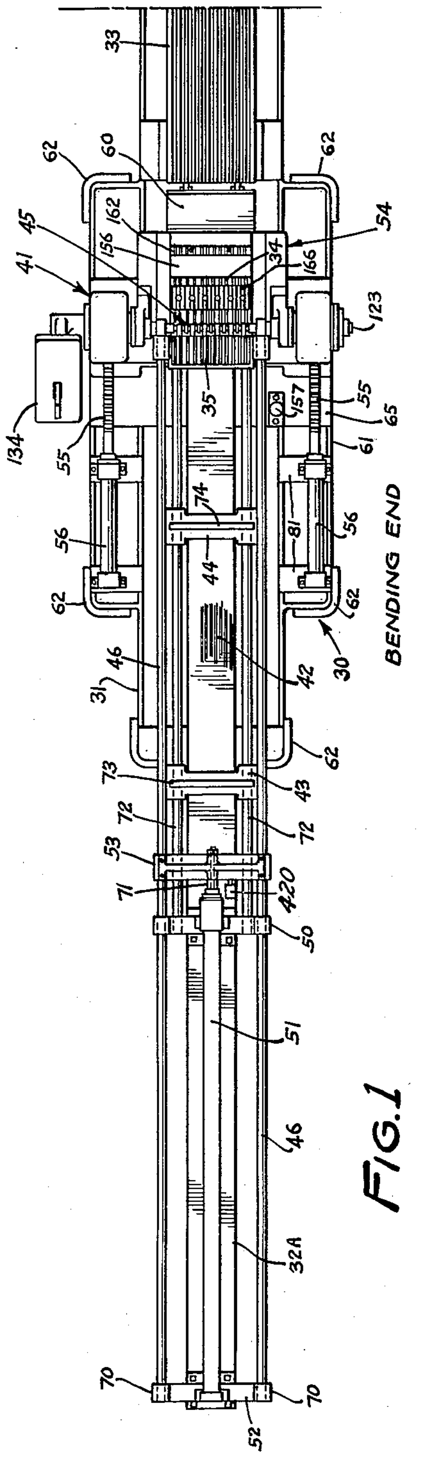
Figure 1 is a partial top plan view of the instant invention.

Referring now to the drawings and particularly to Figures 1–4, the machine of this invention will be described generally, with specific explanation following.

Figure 3:
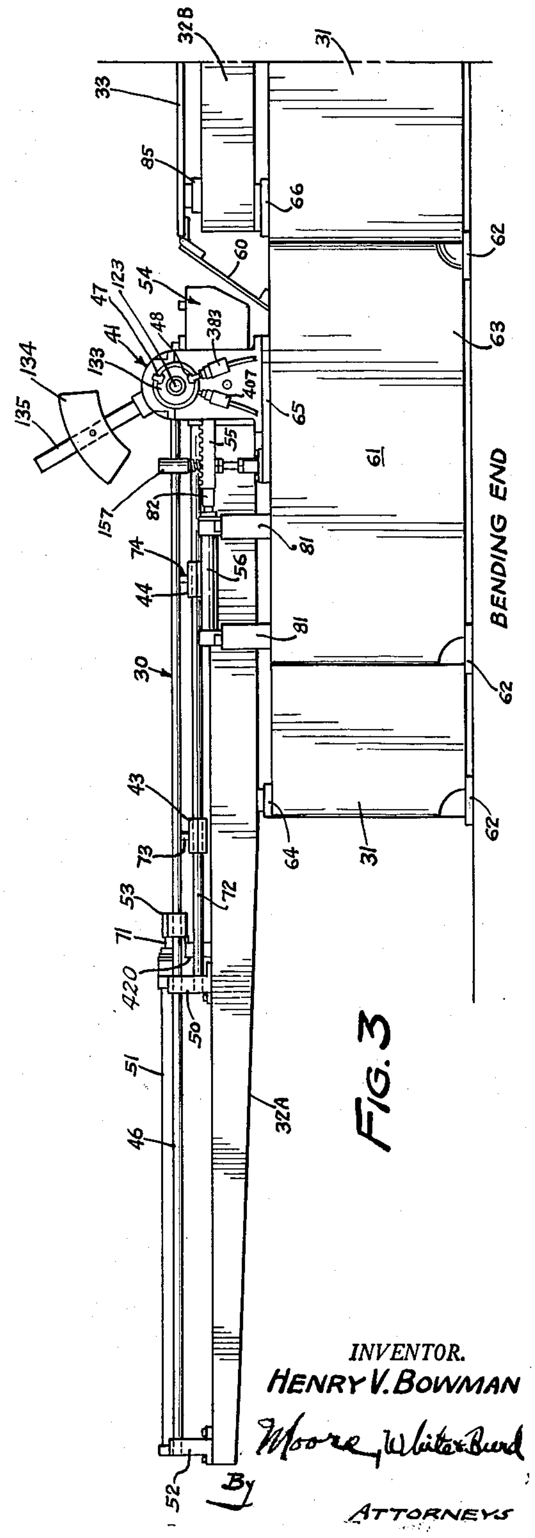
Figure 3 is an elevational view of the structure of Figure 1.
Figures 2, 4, 5, 6:
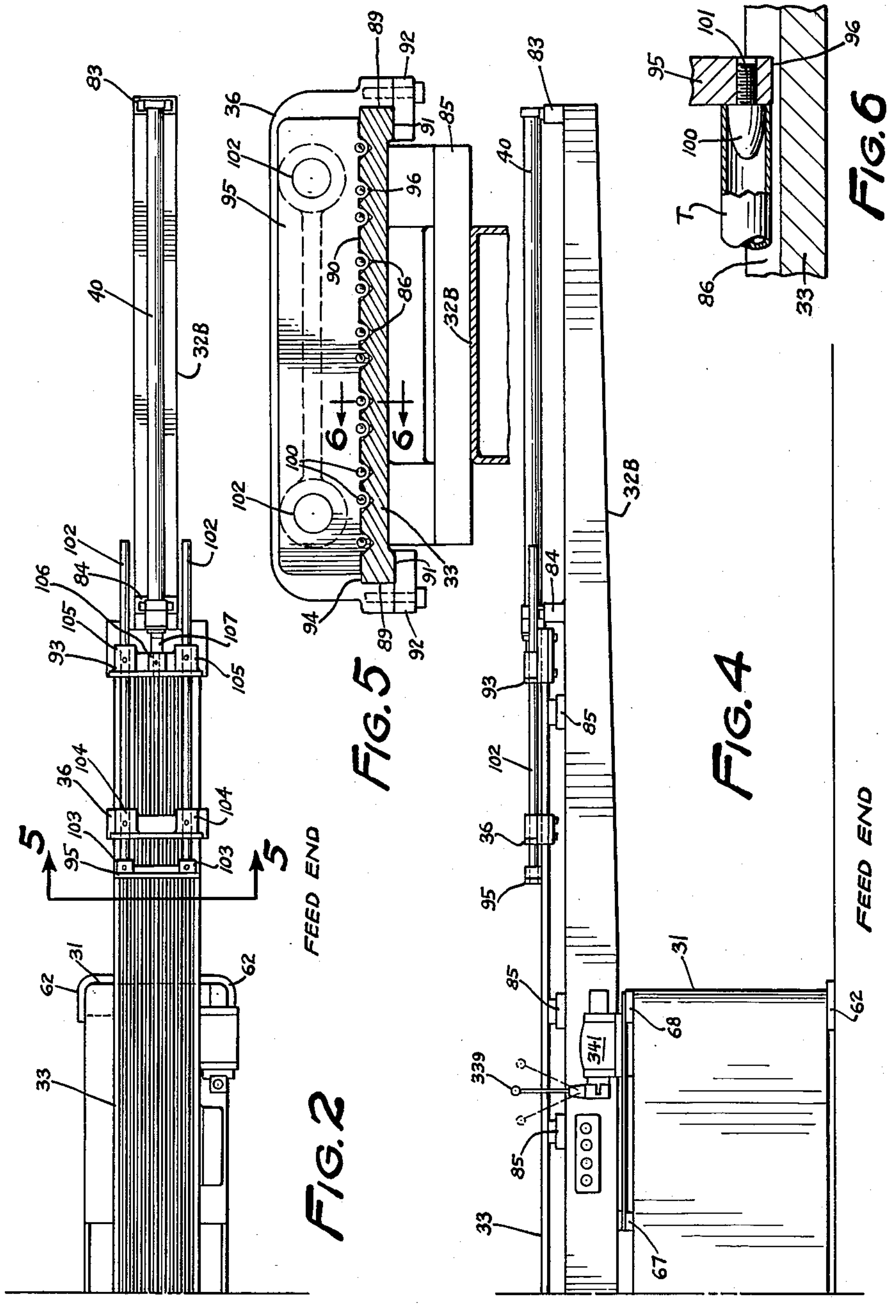
Figure 2 is a partial top plan view which in cooperation with Figure 1 provides a complete top plan view of the instant invention.
Figure 4 is an elevational view of the structure of Figure 2.
Figure 5 is an enlarged vertical sectional view through the loading table and taken along the line and in the direction of the arrows 5—5 of Figure 2.
Figure 6 is a fragmentary vertical sectional view taken along the line and in the direction of the arows 6—6 of Figure 5, enlarged and showing one of the bullet-nosed projections which fits and centers within the tube for applying push thereto.

The bending machine generally designated 30 is supported by a suitable means, in this instance a bench 31, upon which is supported the two part bed of the machine 32A and 32B. The feed end of the machine is shown in Figures 2 and 4 and the bending end of the machine is shown in Figures 1 and 3.

Tubes or conduit in multiple equal lengths are placed upon the loading table 33 preparatory to insertion into the bending dies 34 and 35. The tubes are precut to a given length and are placed on the loading table 33 in spaced grooves which guide the tubes into the bending dies 34 and 35 when the loading head 36 is advanced by the introduction of fluid under pressure into the loading head cylinder 40 positioned to move the loading head from right to left with reference to Figure 2.

On the machine bed is provided a center headstock 41 and on the opposite side thereof is a plurality of rods or internal mandrels 42 supported by a holder 43 and adjustable tube stop 44. The internal mandrels are secured at their leftward ends to the holder 43 and penetrate the adjustable stop 44 which is adjustably secured to the machine bed 32A and provided with spaced apertures for receiving the mandrels 42. When the tubes are slid forwardly into the bending dies 35 by the loading head 36 each tube is slid on one of the mandrels 42 which cooperate to support the tubes in position shown in Figure 7.

The headstock 41 is provided with an external mandrel 45 the ends of which are rotatably supported in bearing blocks secured to a pair of eject rods 46, the eject rods in turn being supported in sleeve bearings in the front support 50 for the eject cylinder 51 and also in the rear support 52 for the eject cylinder 51. Eject cylinder 51 is coupled by coupling 53 to the eject rods 46.

Both the cylinders 40 and 51 are double acting so that the loading head 36 may push the tube through the dies 34 and 35 and into communication with the stop 44 and after the tubes are bent around the external mandrel 45 it may be pushed rightwardly with respect to Figures 1–4 for ejecting the bent tubes and then retracted leftwardly with reference to the same figures to initial position.

Bending dies 34 and 35 are provided with aligned guide apertures and mandrel 45 is externally grooved in cooperation therewith, each groove being adapted to receive a tube during the bending operation.

During bending the tubes are supported in V-shaped grooves in the table as shown in Figure 5 and cooperating apertures in dies 34 and 35, movable front die 34 being provided with clamping means for clamping the tubes securely therein when they have reached bending position. Die 34 supported upon bending apron 54 is movable by the simultaneous actuation of rack bars 55 by cylinders 56 from the position of Figure 12 to the position of Figure 13 for bending the tubes about the internal mandrels 42 and around external mandrel 45 to the position shown in Figure 13. Simultaneously, the spool of external mandrel 45 rotates. At the same time a shelf 60 moves from the dotted to the full line position of Figure 14 for supporting the tubes as they are ejected from the machine.

The specific structural portions of the machine and operation will now be described in detail.

The bench 31 upon which the machine 30 is supported is of heavy welded steel construction providing a peripheral wall 61 and supporting feet or pads 62 which pads or feet rest upon the supporting surface. It extends from left to right as shown in Figures 3 and 4, the bed 32A, 32B of the machine overhanging the ends thereof and has a rectangular enlarged mid-portion 63. To the top edges thereof are secured suitable supporting cross braces 64—68. Upon braces 64 and 65, bed portion 32A is seated and secured, upon brace 65 the headstock 41 is mounted and upon braces 66, 67 and 68 the bed portion 32B is mounted. The particular bench and cross supporting bracing may be varied suitably within the scope and contemplation of this invention.

Figure 15:
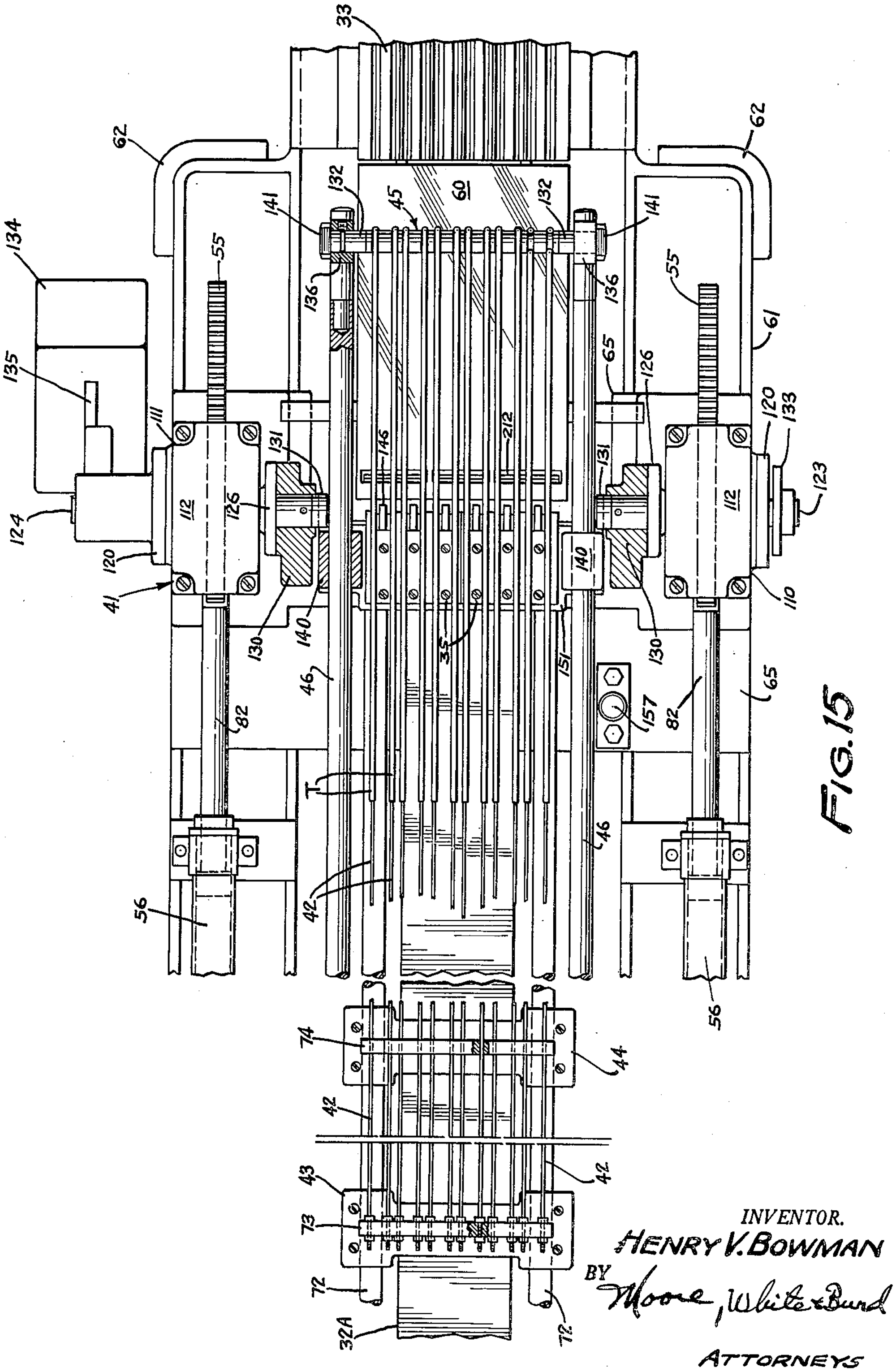
Figure 15 is a top plan view similar to Figure 7 but showing the tubes being ejected.

The bed portion 32A comprises a cantilevered tapered downwardly turned channel having at its outer end the rear support 52 secured in outrigger fashion thereto provided with apertures in which the ends of its ejector rods 46 are adapted to penetrate when the ejector rods are in the initial or rest position of Figure 1 and from which the ends are withdrawn when the ejector rods and mandrel 45 are pushed rightwardly with reference to Figures 1 and 3 to the ejecting position of Figure 15.

The rear end of the eject cylinder 51 is positioned on the rear support 52 and secured at the center thereof as shown in Figure 1. The front end of the eject cylinder is likewise positioned on the front support 50 secured to the bed portion 32A so that the piston rod 71 for cylinder 51 secured to coupling 53, coupling 53 being provided with sleeve apertures at the top and bottom thereof (Figure 1) which are penetrated by rods 46, the rods 46 being removably secured therein by set screws so that actuation of cylinder 51 will move piston rod 71 to move the coupling 53 and consequently ejector rods 46 and mandrel 45. A pair of support rods 72 have one end secured in front support 50 and the other end secured in headstock 41 and provide a pair of rails supporting the internal mandrel holder 43 and the adjustable tube stop 44 which are positioned thereon for leftward and rightward movement with reference to Figure 3 but may be fixed against movement by set screws or other appropriate means. Thus, the holder 43 and stop 44 are fixedly but adjustably positioned on the support rods 72. This is perhaps best seen with reference to Figure 15.

The internal mandrel holder 43 is provided with a plurality of apertures in which the threaded ends of mandrels 42 are situated and secured thereto by nuts on either side of the center web 73 of holder 43. The rod-like mandrels penetrate corresponding apertures in web 74 of stop 44. The mandrels 42 each comprise an end 75 of enlarged diameter as seen best with reference to Figure 12 threaded onto the other end of the mandrel rod 42 having an arcuate end 80. It is this arcuate end which aids in determining the bend of the tube T as will be later explained with reference to Figures 12 and 13.

The bed portion 32B is separated from bed portion 32A as shown in Figure 3 and likewise comprises a cantilevered tapered downwardly turned channel. It has at its outer end a rear support 83 similar to support 52 except without arms 70. Support 83 serves to support only the rear end of loading head cylinder 40 the front end of which is supported by front support 84. A plurality of pads 85 serve to support the loading table 33 which is perhaps best shown in Figure 5. Table 33 is provided with a plurality of spaced V-grooves 86 in the top surface 90 thereof, top surface 90 comprising a plurality of interspaced lands between the grooves 86 as shown in Figure 5. The table is machined at the top surface 90, at its edges 89 and also at the two bottom edge portions 91 which extend the length of the table from left to right in Figures 2 and 4. The edge portions 89, 91 serve as rails in abutment with which are the machined surfaces of members 92 of the loading head 36 and similar members of the loading head cap 93. As shown in Figure 5 the loading head 36 is provided with machined recesses at 94 which in cooperation with machined surfaces of members 92 form channels engaging the machined edges of table 33. The grooves 86 serve to support the tubes to be bent as they are engaged by pusher bar 95, which by action of cylinder 40 forces them into the bending position of Figure 7.

Pusher bar 95 has the configuration best shown in Figure 5, including a plurality of depending rounded protuberances 96 one of which is adapted to seat in each groove 86 for travel therealong. On each one of the protuberances 96 is a bulletnose projection 100 which has a threaded end 101 threaded into an aperture in projection 96. One of each of the projections 100 engages into the end of a tube T to push the tube into bending position and the base diameter of the projection is chosen to fit snugly within the interior diameter of the tube as shown in Figure 6.

The pusher bar 95 is supported upon two loading head rods 102 which are secured to the apertured bosses 103 of said pusher bar 95. Rods 102 are parallel, of the same diameter and are received in apertures in sleeve bosses 104 of pusher head 36 and are secured therein for reciprocation with the pusher head by set screws. Rods 102 are received in similar bosses 105 in pusher head cap 93 and are likewise secured thereto. Pusher head 93 is substantially similar in cross-section to head 36 and rods 102 are similarly secured thereto but the base portion is slightly elongated as shown in Figure 4. Cap 93 is provided with a central sleeve boss 106 in which is secured the end of piston rod 107 of cylinder 40.

Figure 7:
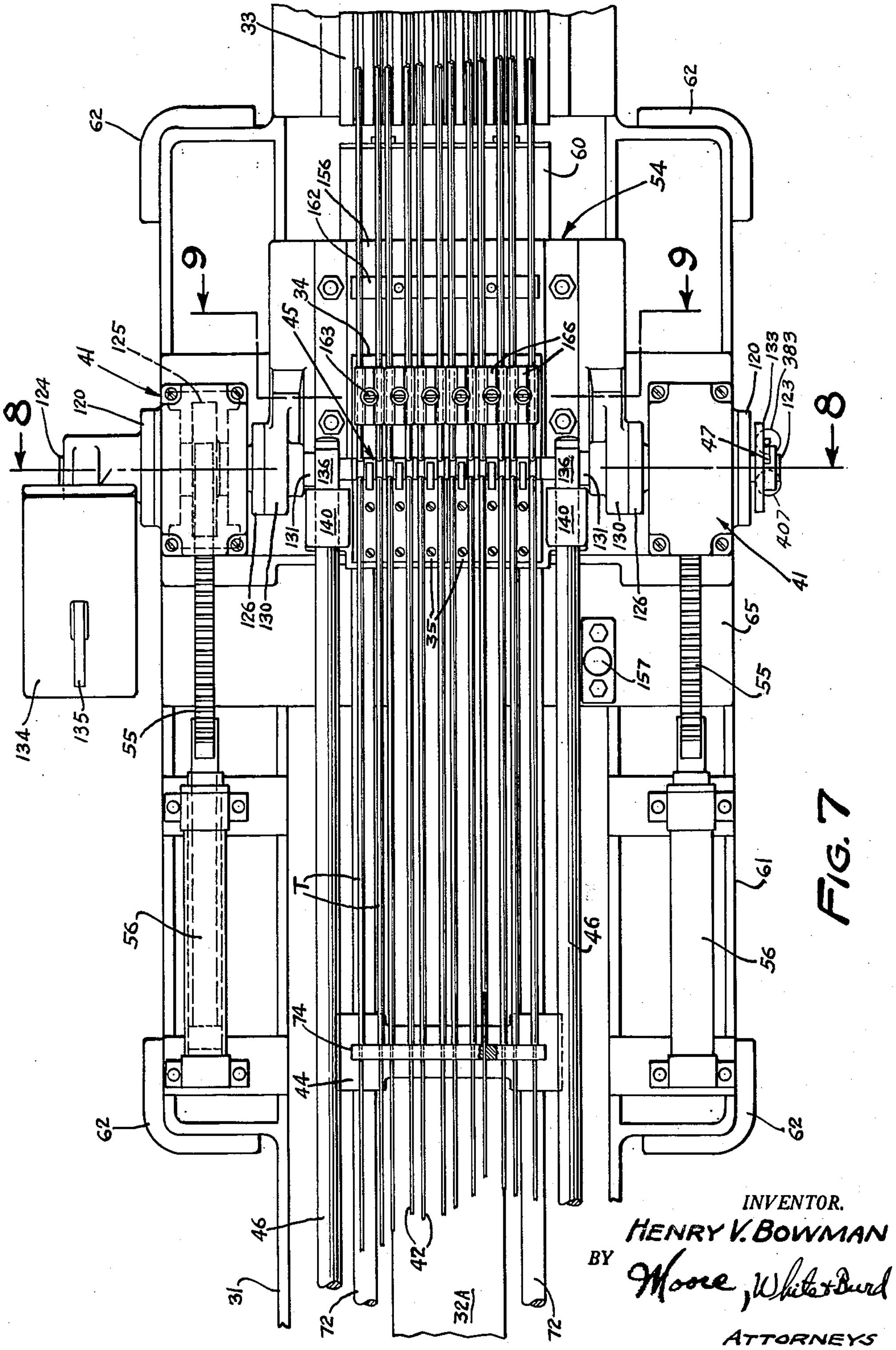
Figure 7 is an enlarged fragmentary top plan view and showing the headstock bending apron and tubes in position about to be bent.

Thus, it will be seen with reference to Figures 2, 4 and 5 that as the rod 107 for cylinder 40 is extended by action of cylinder 40, cap 93, head 36 and pusher bar 95 will move leftwardly with reference to Figure 2 moving the projections 96 in the grooves 86, the bulletnoses 100 from right to left and pushing the tubes T to be bent through the dies 34 and 35 and into the position of Figure 7.

Figure 8:
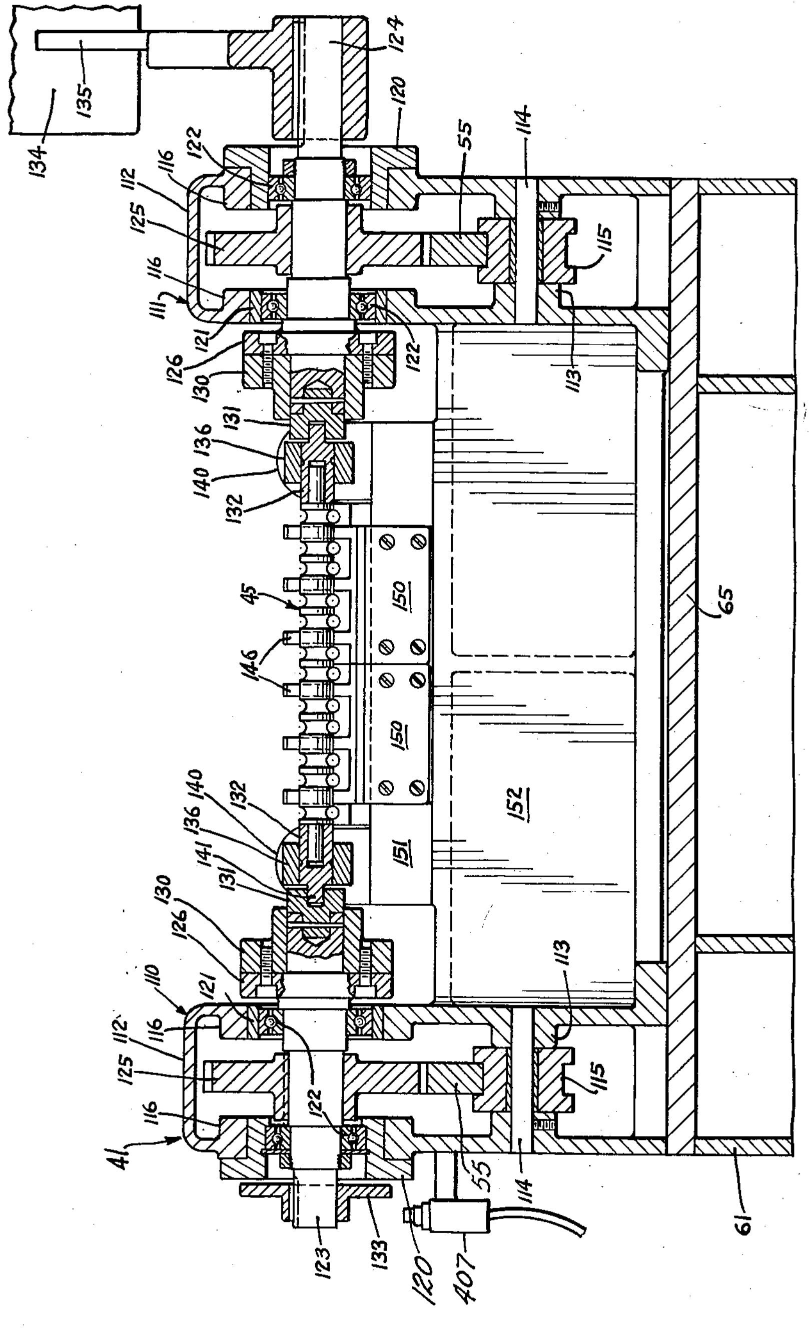
Figure 8 is a vertical sectional view through the headstock taken along the line and in the direction of the arrows 8—8 of Figure 7.

The headstock 41 as shown best in Figures 8 and 15 comprises a pair of upright bearing supports 110 and 111, identical, except that supports 111 and 110 respectively form a top bearing support and a bottom bearing support with reference to Figure 15, and a right bearing support and left bearing support with reference to Figure 8. Each is provided with a removable rounded cap portion 112 and is hollow as shown in Figure 8. The brace 65 is substantially in the form of a substantially rectangular brace as seen in Figure 15 and each one of the bearing supports 110, 111 is supported at one end of brace 65 by being bolted or otherwise secured thereto. Each of the supports 110, 111 is provided with cooperating apertures at either side thereof for the penetration of rack bars 55 as shown in Figure 15. Each is also furnished with two pairs of inwardly and oppositely disposed bosses 113 which are apertured to receive rack roller shafts 114 upon which is journalled rack rollers 115 adapted to be engaged by the machined bottom and side edges of rack 55 as shown. Since rollers 115 are aligned one behind the other, only one is visible for each of members 110 and 111 in Figure 8.

Each of members 110 and 111 is also provided with opposed and inwardly directed bosses 116, the outer one of which serves to support a bearing flange 120 and the inner one of which serves to support a bearing bushing 121. Cooperating flanges 120 and bushings 121 each support a roller bearing 122 which for support 110 supports a shaft or trunnion 123 and for support 111 supports a second shaft or trunnion 124 or shaft. Trunnions 123 and 124 are journalled for rotation in bearings 122.

To the center of the trunnions 123 and 124 is secured drive gears 125, spur gears meshing with their respective racks 55, and to the inwardly directed end thereof is secured a flange 126 to which is bolted a supporting sleeve 130 of bending apron 54. Thus, as trunnions 123 and 124 rotate so will bending apron 54.

The inner ends of shafts or trunnions 123 and 124 are provided with a well in which is pinned the projecting portion of index blocks 131. Index blocks 131 are each provided with a parallel and horizontally directed rectangular aperture adapted to receive machined rectangular projection 141 on external mandrel drive block 132.

To the external end of shaft 123 is keyed for rotation therewith a cam disc 133 provided with cams 47 and 48 (Figures 1, 7, 8) for engaging switches 383 and 407 as later explained. To the external end of shaft 124 which has a somewhat longer extension than the external end of shaft 123 is secured an arm 135 which adjustably supports a counterweight 134 having a hub keyed to said end of shaft 123.

As will be seen, the counterweight assists the drive of racks 55 as they are moved from left to right with reference to Figure 3, since the two racks are connected not only through the shafts 124 and 123 and external mandrel 45 (when in bending position) but also through the bending apron 54.

The external mandrel 45 as shown best with reference to Figure 8 comprises a plurality of annular grooves interspaced with a plurality of annular lands and its ends provide a pair of extending trunnions, is secured for rotation to mandrel drive blocks 132. Drive blocks 132 are journalled for rotation in bearing blocks 136 upon the end of eject rods 46 supported in ejector rod bearings 140 which are a part of the die pad 151 of back die 35.

In this fashion it will be seen that as racks 55 are moved leftwardly with reference to Figure 15 the spur gears 125 rotate shafts 124 and 123, shafts 124 and 123 being interconnected by the bending apron 54 secured thereto by supporting sleeves 130 and also by external mandrel 45 having the ends of its mandrel drive blocks 132 inserted in index blocks 131. Thus, the external mandrel 45 and shafts 123—124 are rotated against the weight of counterweight 134. As will be apparent from Figures 8 and 15, external mandrel 45 may not be moved from the engaged position of Figure 8 to the disengaged position of Figure 15 until its rectangular block ends 141 and the corresponding grooves of index blocks 131 are in the horizontal position so that movement of eject rods 46 may slide block ends 141 from the grooves of index blocks 131.

Figure 10:
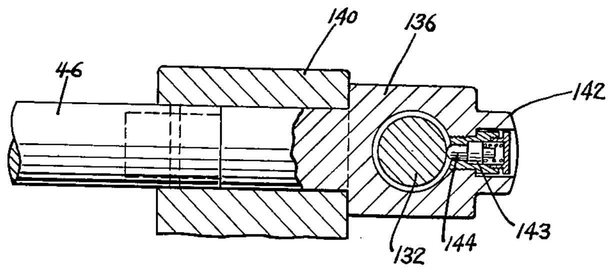
Figure 10 is a fragmentary vertical sectional view taken along the line and in the direction of the arrows 10—10 of Figure 9.

As seen best in Figure 10, the external mandrel bearing blocks 136 supported on the ends of ejector rods 46, reciprocable in bearings 140, is provided with an enlarged protuberance 142 apertured to provide a seat for spring biased detent assemblies 143. Assemblies 143 are provided with detents 144 having rounded noses for engagement with annular grooves in drive blocks 132 to hold the blocks and consequently the external mandrel 45 against sidewise motion. As seen with reference to Figure 3 the assembly 143 may be adjusted to tighten the compression spring to provide greater or lesser bias as desired of detent 144 in communication with the annular groove in block 132.

The external mandrel 45 when in the position of Figures 1, 3 and 7 has a plurality of its lands received in recesses of cooperating arcuate fingers 146 of mandrel supports 150 bolted or otherwise secured to back die 35.

Figure 11:
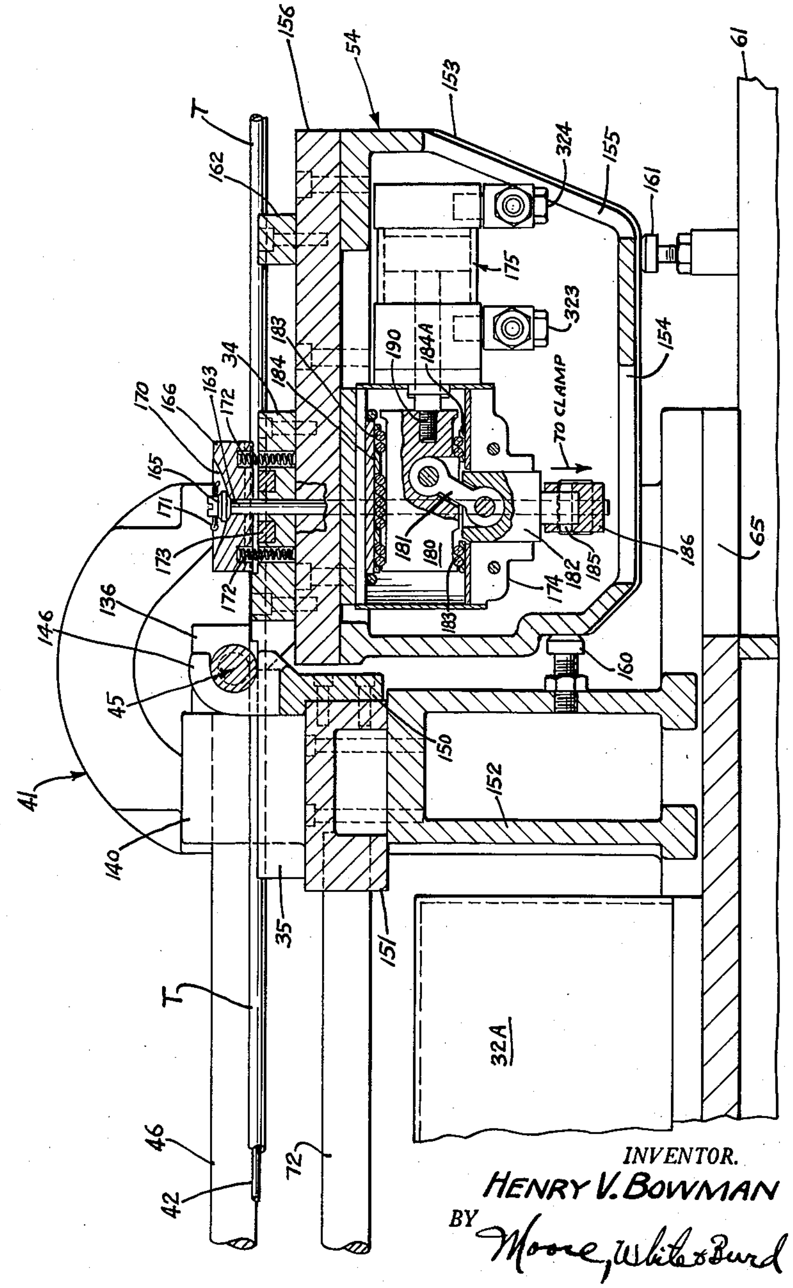
Figure 11 is a vertical sectional view taken along the line and in the direction of the arrows 11—11 of Figure 9.
Figures 12, 13:
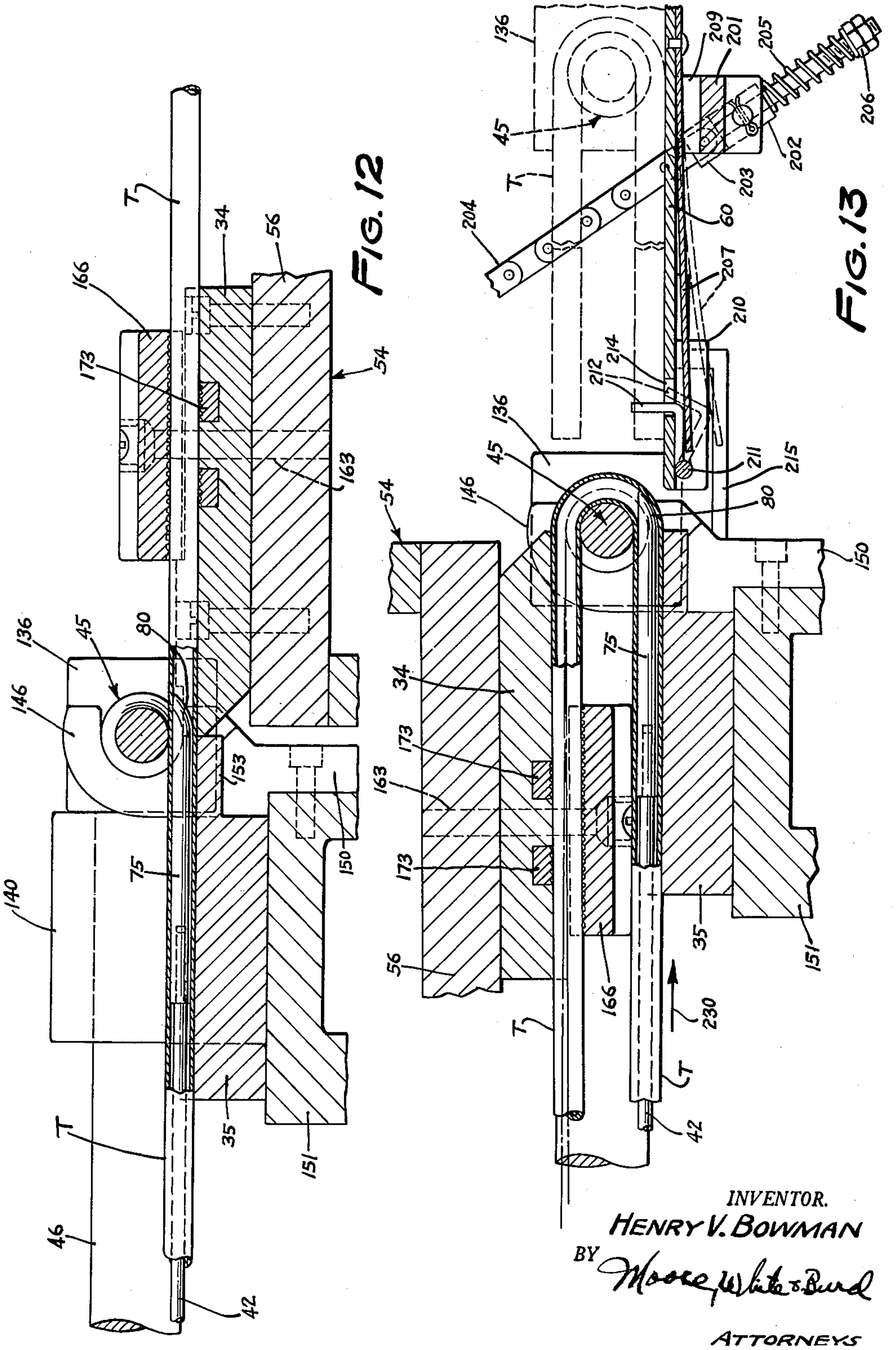
Figure 12 is an enlarged fragmentary vertical sectional view of the external mandrel and front bending dies showing tubes in position before bending.
Figure 13 is a view similar to Figure 12 but showing the structure and tubes in position after the tubes are bent by full lines, and in partially ejected position by dotted lines.

The rear die 35 is supported upon a pad 151 which also supports rod bearings 140 (Figure 15) and the ends of rods 72 (Figure 11). It is secured to a transverse member 152 of U-cross-section joining the headstocks 41 and in turn supported upon members 65. The rear die 35 is in this instance split in two portions along a median line and each portion is bolted to pad 151 to form a complete die having a plurality of upwardly concave linear grooves or recesses aligned with the recesses in table 33 and forming a prolongation thereof for supporting the tubes T to be bent as in the position of Figures 7 and 11. The rear die 35 is provided with a plurality of extensions 153 likewise having the prolonged arcuate grooves and extending between fingers 146 as shown in Figures 8, 11 and 12 to give additional support to the tubes T.

The bending apron 54 is supported by the sleeves 130 and comprises a cover 153 (Figure 11) having a bottom aperture 154, and a side aperture 155. Secured to the cover by volts is plate 156. Cover 153 is provided to abut a first adjustable stop 160 and a second adjustable stop 161 secured to members 152 and 32A respectively for determining the rest limit position of the bending apron 54 as shown in Figure 11. A third adjustable stop 157 (see Figures 1, 3 and 7) provides a resilient cushion for engaging apron 54 as it completes its bending operation to assume the position of Figure 14 to determine its operational limit position. On the top surface of member 156 (the position of Figure 11) is supported a loading comb 162 bolted thereto and having aligned concave recesses aligned with the grooves in the mandrel 45 and the recesses in the rear die 35 and also with the internal mandrels 42. Front die generally designated 34 is bolted to the plate 156 between mandrel 45 and loading comb 162 as shown in Figure 11 and is a bipartate die split along a median line. It is likewise provided with a plurality of grooves aligned with the grooves in the loading comb and rear die 35.

Figure 9:
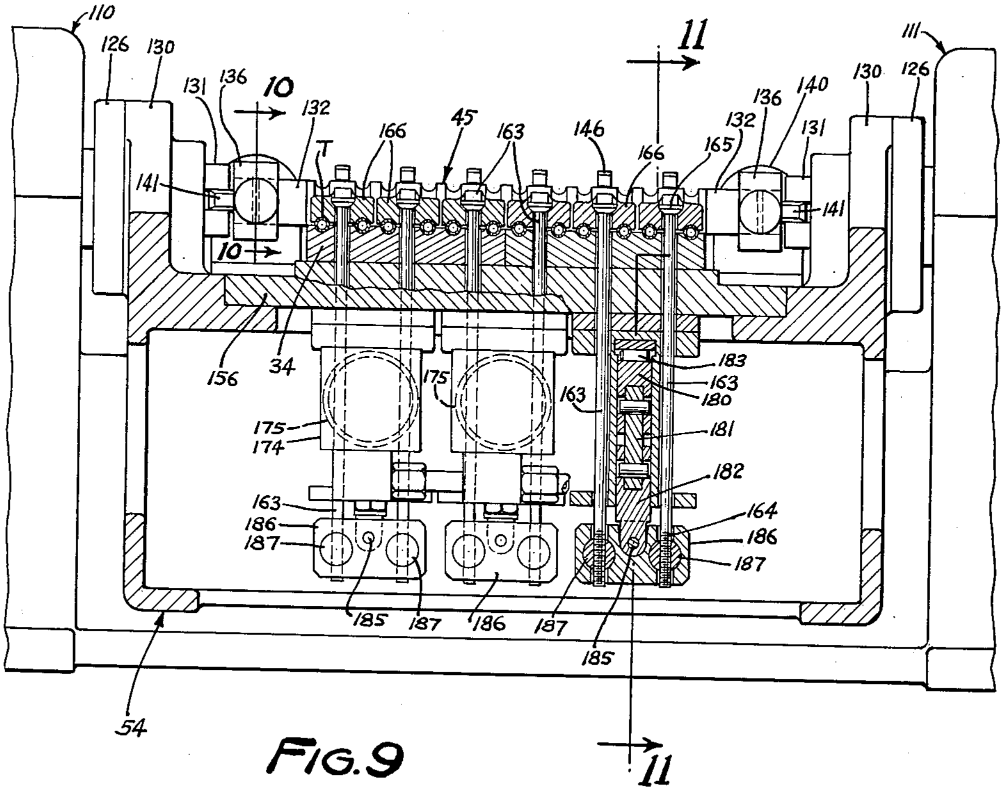
Figure 9 is a vertical sectional view taken along the line and in the direction of the arrows 9—9 of Figure 7.

Die 34 is penetrated by a plurality of parallel vertically extending cylindrical apertures in this instance six in number in one of each of which is received a clamp screw 163 extending therethrough, having a threaded end 164 and a configured head 165. On each screw 163 adjacent head 165 is positioned a clamp block 166 of inverted T cross-section as shown in Figure 9 having a central aperture provided with a countersunk surface to receive the configured head of screw 163. The inverted base of the T is provided with an arcuate longitudinal slot 170 so that the cotter key 171 may be inserted in the head 165 of screw 163 to retain the block and screw head as a unit.

Each one of the blocks 166 as shown in Figure 9 thus provides a portion extending on either side of the screw 163 providing a downwardly turned machined face having upwardly concave ribbed recesses or grooves therein, the recesses being provided two for each clamp block aligned with respective recesses in the die 35 to provide a cylindrical confine for a tube T. Thus, it will be seen with reference to Figure 9 that each screw 163 and block 166 clamps two tubes in respective grooves in die 35, one tube on either side of screw 163.

Springs 172 penetrate cooperating wells in die 34 and blocks 166 to bias the blocks 166 upwardly with reference to Figure 11 or in spread or spaced position with reference to die 34 and thus allow the entrance of tubes therebetween, and it is against the bias of these springs that blocks 166 are drawn when in position to clamp the tubes between themselves and die 34.

The die 34 as shown in Figure 11 is provided with corrugated inserts 173 positioned in recesses therein and forming a part of the surface of the die, concave surface portions of the recesses in the corrugated inserts forming part of the aligned apertures in face of die 34. These inserts are corrugated in a direction transverse to the extension of tubes T when shown in Figure 11 and serves securely to insure that once the tubes are gripped between the corrugated or ribbed upwardly concave recess in clamp block 163 and die 34 it will be immobilized.

Secured to the bottom of member 156 is a plurality of clamp cylinders 175, three in number and each provided with a plurality of toggle housings 174 each in turn provided with a clamp cylinder 175. Clamp cylinders 175 are appropriately manifolded together for simultaneous action. To the threaded end 190 of the piston for each of cylinders 175 is secured the toggle slide 180. Slide 180 is provided with an upward machined surface cooperating with rollers 183 retained by retainer 184 in communication with an upper wear plate.

Slide 180 is also provided with bottom machined surfaces supported by rollers 183 retained by retainers 184A in communiction with lower wear plates as shown in Figure 11. In a recess in slide 180 is pivoted one end of the toggle arm 181, the other end of which is pivoted in a pivot block 182.

Block 182 is provided with a protruding portion which is pivotally pinned at 185 to a rocker arm 186. Arm 186 is provided with apertures in which are positioned threaded members 187, in one of each of which the threaded end of rod 163 is engaged.

Thus, as will be seen with reference to Figure 11, when the cylinder 175 is actuated to push slide 180 leftwardly with reference to Figure 11, it through arm 181 will force the block 182 downwardly and hence through rocker arm 186 and rods 163 will cause block 166 (two for each cylinder 175) to move against the bias of springs 172 to clamp two tubes T in between block 166 and the corresponding apertures of die 35. When the cylinder 175 is actuated to move slide 180 rightwardly with reference to Figure 11, the tubes are unclamped.

Since two blocks 166 and rods 163 are provided for each cylinder 175, the rocker arm 186, pivot 185 and members 187 will insure the equalization of clamping force between these two blocks.

Figure 14:
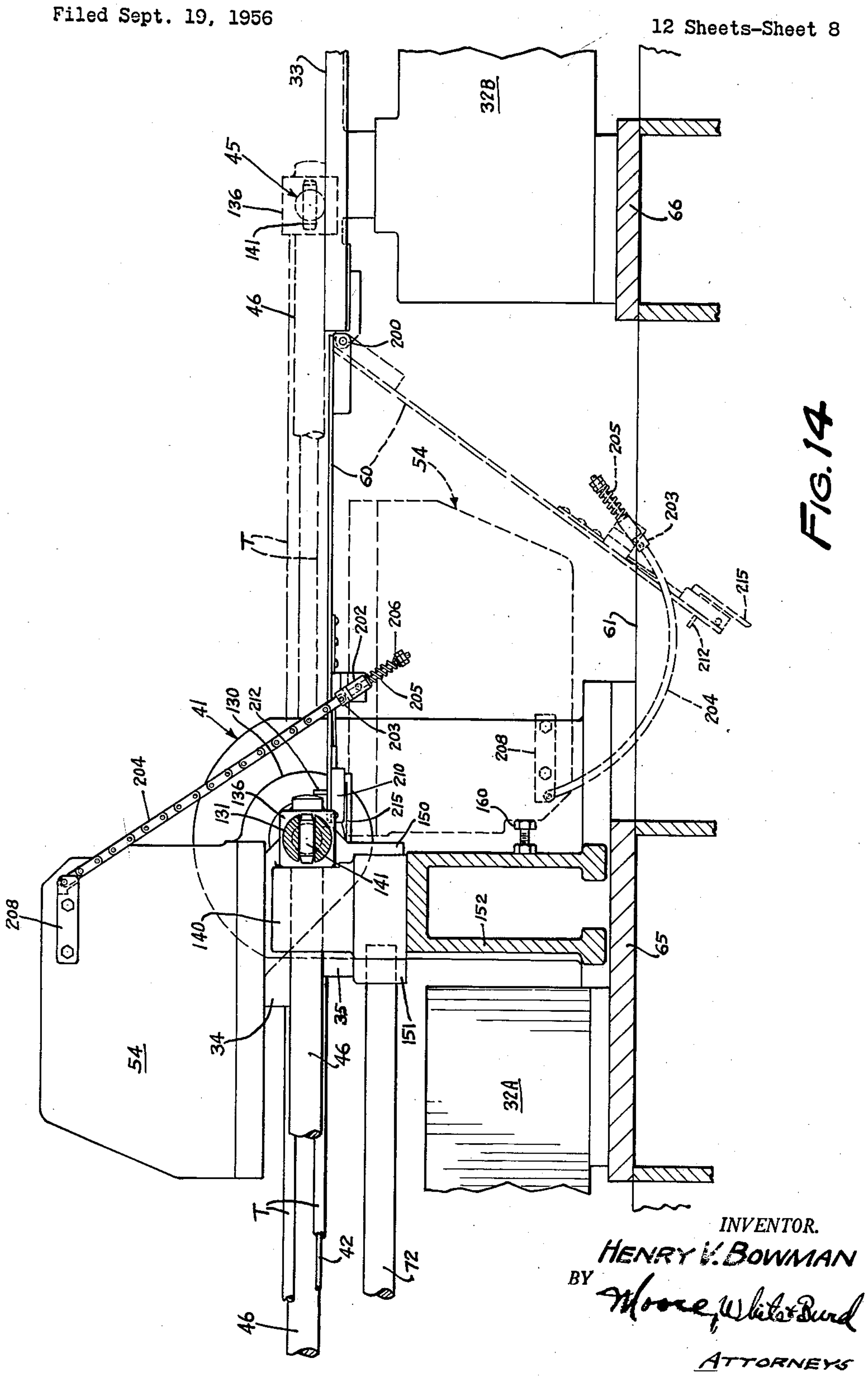
Figure 14 is an elevational view, partially in section, and showing the bending apron in the position of Figure 13 in full lines and in the position of Figure 12 by dotted lines.

The shelf 60 as shown in Figures 14 and 16 is hinged by hinges 200 to the underside of loading table 33. It is provided with an outrigger 201 at either end of which is pivoted a swivel block 202 having an aperture in which a bifurcated chain anchor 203 is secured, the bifurcated end being secured to the chain 204 and the threaded extending stem end having a spring 205 positioned between block 202 and nut 206. The other end of the chain 204 is pivotally secured to an apron chain anchor 208 bolted or secured to the apron 54. The outrigger 201 is spaced away from the bottom of shelf 60 by blocks 209 so that resilient tongue 207 may be secured to said shelf. Tongue 207 projects as shown in Figure 16. The left end of the shelf with reference to Figure 16 is provided with depending lugs 210 which support a rod 211 journalled for rotation therein to which is secured a plurality of angle members 212. Members 212 are shown best in Figure 13. The members 212 are each provided with an upright flange penetrating transverse aperture 214. A pair of shelf hooks 215 is secured to the underside of the shelf as shown in Figure 16.

Thus, as the apron moves from the dotted line to the full line position of Figure 14 in bending the tubes T about the external mandrel 45, shelf 60 moves on hinges 200 from the dotted line to the full line position of Figure 14 by drag on chains 204 through chain anchors 203 and 208, the springs 205 allowing equalizing pull on the shelf 60 as the hooks 215 engage the underside of die 34 as shown in Figure 14.

The members 212 comprise a stop under the bias of resilient tongue 207 so that after the tubes are bent, they may be ejected from the machine from left to right with reference to Figure 13, the arcuate portion of the tube engaging member 212 and forcing it from the full to the dotted line position of Figure 13, as it rides thereover. However, when the ejector rods 46 are retracted and after the ends of the tubes have passed stops 212 in a rightward direction, the bias of tongue 207 will cause stops 212 to rise and thus when the ends of the tubes T engage stops 212 in a leftward direction as mandrel 45 is retracted, stops 212 will engage the ends of the tubes withdrawing them from mandrel 45 as it is retracted leftwardly with reference to Figure 13.

In Figures 17–19 there is shown a tube T bent around a vertical axis in which the ends 220 and 221 of the tube are not supported, as is common. It will be noted that when so bent in a horizontal plane the end 220 has dropped several degrees with reference to the end 221 and is not parallel thereto. However, in Figures 20–22, there is shown a tube bent about a horizontal axis or in a vertical plane with one arm supported and one arm unsupported during bending and this tube is perfectly aligned with ends 220A and 221A in parallel since the force of gravity as the tube is bent about a horizontal axis and in a vertical plane acts in the plane of bending, whereas the force of gravity when a tube is bent about a vertical axis and in a horizontal plane acts at right angles to the plane of bending.

Thus, in the operation of this machine, the tubes are first loaded onto the table 33 in grooves 86 with the pusher bar 95 in the position of Figure 2. The tubes are positioned so as to penetrate the apertures formed by the cooperating grooves in comb 162, die 34 and clamp blocks 166 and also the grooves in back die 35 passing under the annular grooves in mandrels 45, one tube passing over each end 75 of internal mandrels 42. The tubes are initially positioned on tables 33 and the grooves 86 align them for this movement. As pusher bar 95 reciprocates from right to left with reference to Figures 2 and 4 under the action of cylinder 40, bulletnose projections 100 will engage the end of the tubes forcing them through the grooves or recesses in table 33 through the grooves in comb 162 through the grooves provided by blocks 166 and die 34, underneath the external mandrel 45 through the cooperating annular grooves thereof, through the grooves in die 35 and onto ends 75 of internal mandrels 42 and into engagement with the stop bar 44.

Actuation of the cylinders 175 will then cause the clamp blocks 166 to move against the bias of the springs 172 and securely clamp the tubes between the corrugations thereof and the corrugations in inserts 173 in die 34. The tubes will at this time be resting in the grooves of comb 162. With the tubes securely clamped, cylinder 40 is actuated in the opposite direction to move the pusher bar 95 right to left with reference to Figures 2 and 4 so that projections 100 will become disengaged from the ends of the tubes.

The mandrel 45 will be in the position of Figures 1, 3 and 7. Figure 7 shows in enlarged plan view the tubes in position loaded and ready to be bent. Actuation of cylinders 56 will cause rack bars 55 to rotate the bending apron 54, the external mandrel 45 in unison and the tubes will be drawn around the arcuate portions of members 75 as shown in Figures 12 and 13 the bottom portion of the tube T moving slightly in the direction of the arrow 230 as shown in Figure 13 by virtue of the bending of the tube around the mandrel 45 by movement of bending apron 54 and consequently of the clamp blocks 166 and bending die 34.

The upper arm of the tube is bent slightly over center as shown in Figure 13 to compensate for the natural resiliency of the tube which will cause it to return to the center or horizontal when bending pressure is released. As apron 54 moved from the dotted line position of Figure 14, the shelf 60 is moved from the dotted to the full line position ready to support the bent tubes as they are ejected.

Since the rectangular members 141 are then in the position of Figure 8, actuation of cylinder 51 will move them from engagement with index blocks 131 and mandrel 45 from the full to the dotted line position of Figure 13 after the cylinders 175 have been actuated in opposite direction to release clamping pressure upon the bent upper arms of the tubes. As the mandrel 45 moves from the full to the dotted line position of Figure 13 the ends of the bottom arm of tubes T pass the stops 212 and stops 212 are forced from the dotted to the full line position of Figure 13 by tongue 207.

The cylinder 51 is then actuated in the opposite direction returning the mandrel 45 to the rest position of Figures 1, 3 and 7 and cylinder 56 is actuated in the opposite direction to return the bending apron 54 and shelf 60 to the position of Figure 3, from the dotted line position of Figure 14.

Thus, it will be seen that there is provided a tube bending machine which will provide hairpin bends in hollow tubes or conduits in which the tubes are removed from engagement with the clamping members after bending by applying a removing force to the inner arcs of the bent portions by an arbor or external mandrel rather than applying removing pressures to the ends of the tubes. This eliminates fracturing the ends of the tubes or bending of the tube ends. Upon return of the arbor or mandrel to the inoperative position at the bending station, the bent tubes remain on the loading table whereby they may all be picked up by passing a rod through the parallel bent ends and the tubes lifted away from the machine. Thus a number of tubes may be bent simultaneously about a horizontal axis and the tubes unloaded from the machine by using the external mandrel or spool to pull the hairpins off the internal mandrels.

The provision of the grooved external mandrel and its mounting for rotation during the bending action, together with the arcuate periphery of the internal mandrel and cooperating bending dies minimizes the frictional engagement of the tubes with the periphery of the external mandrel and thereby prevents overstressing of the tubing during the bending operation.

According to the method of this invention, an elongated tubular member is to be provided with a hairpin bend. Likewise according to the method of this invention a plurality of tubular members may be simultaneously provided with hairpin bends. The elongated tube to be bent is initially placed in a substantially horizontal plane at a loading station and supported in this position from below. It is then engaged at one end by a centering device or pusher and traversed to a bending station upon an internal mandrel support having an extending end providing an arcuate surface about which the tube is to be drawn during bending. The tube traverse is stopped when the tube has traversed a predetermined distance on said internal mandrel support and provides an internally supported portion and an overhanging portion. The tube is supported from below adjacent said arcuate surface. The tube is then immobilized throughout a section of said overhanging portion, said section being only slightly spaced from the arcuated end of said internal mandrel support, a distance slightly more than the arcuate extension of said bend when completed.

An external mandrel having an arcuate surface is then placed at the juncture of said internally supported and overhanging portions, spaced slightly with respect thereto so that said tube may be bent therearound. The tube is then drawn through slightly over 180 degrees by said immobilized portion (not substantially less than 180 degrees nor substantially more than 185 degrees) so that when bending is completed and the tube is released, the natural resiliency of the tube will absorb such slight excess bending and the tube will be provided with parallel legs joined by a hairpin bend. The bending is accomplished about a horizontal axis. As bending is being accomplished, the internally supported portion is permitted to slide on said internal mandrel and said external mandrel is rotated at a peripheral velocity substantially equal to the linear velocity of said portion. The tube is then freed and removed from said bending station to a supporting surface at the loading station by translating said external mandrel to apply removal pressure to the inner arcs of the bends, whereupon the removal pressure is removed. If a plurality of tubes are being simultaneously bent, they are then engaged by a linear member at the inner arcs of the bends for removal from the supporting surface.

Figure 24:
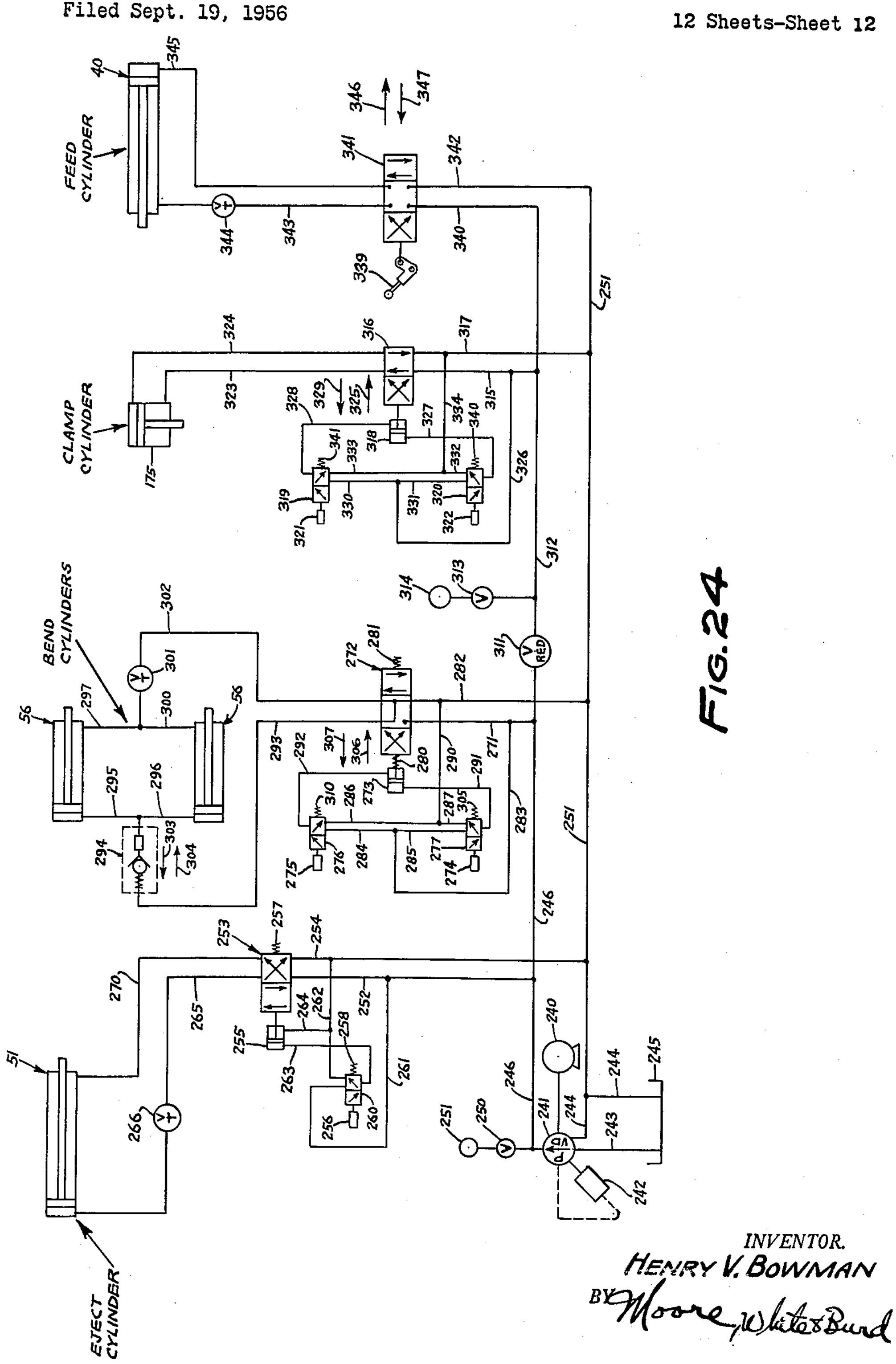

The hydraulic circuitry is schematically illustrated in Figure 24. There is shown an electric motor 240 operating a variable volume pump 241 provided with a pressure compensator 242, an intake line 243 and an exhaust line 244 to a fluid reservoir 245. Pressure is provided to line 246 which is provided with a valve 250 and pressure gauge 251.

*Eject cylinder*

Line 246 is connected via line 252 to a control valve 253. A return line 254 connects valve 253 to line 251 supplying a return via exhaust 244 to reservoir 245.

Valve 253 is a four-way control valve operated by a pilot cylinder 255 controlled by a solenoid 256. Solenoid 256 operates the pilot valve 260 which controls the pilot cylinder 255 which controls the valve 253.

Valve 260 is connected via line 261 to line 252, via line 262 to line 254, and via line 263 to cylinder 255. Line 264 connects the cylinder 255 to line 262 as shown.

Line 265 connects valve 253 through a throttle valve or speed control 266 to one end of cylinder 51 and line 270 connects the other end thereof to valve 253.

Thus, when the valve 253 is in the datum, initial or rest position of Figure 24 (so biased by spring 257) the piston of the eject cylinder 51 is retracted as shown. In this position no pressure is transferred by line 261 through valve 260 since it is likewise biased by spring 258 to the position shown and consequently lines 263, 264 deliver to line 262 and then to exhaust line 254. There is therefore no operation of pilot valve 260 or valve 253 at this time.

In this position valve 253 connects lines 252 and 270 and lines 254 and 265 so that pressure is delivered through line 270 to cylinder 51 to maintain its piston in the position shown in Figure 24.

When the solenoid 256 is energized, it moves valve 260 against the bias of spring 258 from position of Figure 24 to connect lines 261 and 263 and to disconnect lines 262 and 263. Pressure is thus exerted on the piston of pilot cylinder 255 moving it and the valve 253 against the bias of its spring 257. Line 264 then delivers to line 262 in turn delivering to line 254 and to exhaust line 244. As the valve 253 is moved against the bias of its spring it serves to connect lines 252 and 265 and lines 254 and lines 270 so that pressure is exerted through valve 266 on the piston of cylinder 51 to move it rightwardly with reference to Figure 24 to eject tubes from the machine. When the solenoid 256 is de-energized, valves 260 and 253 return to the position of Figure 24 by spring bias whereupon lines 252 and 270 will be connected to retract the piston of cylinder 51 as in initial position.

*Bend cylinders*

Line 246 is also connected via line 271 to valve 272 which is a three position four-way control valve operated by a pilot cylinder 273 controlled by a pair of solenoids 274 and 275 and centered by opposed action of springs 280 and 281. Solenoid 275 operates a pilot valve 276 and solenoid 274 operates a pilot valve 277 which control the pilot cylinder 273 which in turn controls the valve 272.

Line 271 connects line 246 to valve 272. A line 282 connects the valve 272 to return line 251. Line 271 is also connected by line 283 to lines 284 and 285, line 284 leading to valve 276 and line 285 leading to valve 277. Valves 276 and 277 are connected by lines 286 and 287 to a common line 290 which provides a return to line 282. Valve 277 is conected by line 291 to cylinder 273 and valve 276 is connected by line 292 to cylinder 273.

Valve 272 is connected by line 293 through a valve 294 to branch lines 295 and 296 to bend cylinders 56. Bend cylinders 56 are also connected by lines 297 and 300 to line 302 through a throttle or return speed control valve 301 to cylinder 272.

Valve 301 controls the return speed and valve 294 is a manually set valve which provides free flow in the direction of arrow 303 and manually adjusted restricted flow in the direction of arrow 304 to control the speed of the bending by cylinders 56.

When the solenoids 274 and 275 are in the position of Figure 24, fluid from line 283 through lines 284 and 285 is blocked off at each of valves 276 and 277, and lines 293 and 302 both deliver to line 282. Valves 276 and 277 are connected via lines 286, 287 and 290 to return line 282 and via lines 291 and 292 to cylinder 273 equalizing pressure on the piston of cylinder 273 so that it remains in equilibrium. At this time line 282 is connected via lines 293 and 302 to both of cylinders 56 on either side of the piston thereof so that they likewise remain in equilibrium.

When solenoid 274 is moved against the bias of its spring 305 which spring normally retains it in the position shown in Figure 24, it connects line 285 to line 291 and disconnects line 287 and line 291. Thus pressure is supplied to 291 and to the piston of cylinder 273 to move it in the direction of the arrow 306. The return side of cylinder 273 is connected through line 292 and lines 286 and 290 to return line 282. The operation of cylinder 273 in the direction of the arrow 306 will serve to operate valve 281 and to connect lines 271 and 302 and lines 282 and 293. Thus, pressure will be supplied to line 302 which through throttle valve 301 and lines 297 and 300 will supply pressure to cylinders 56 to retract them. Fluid will be exhausted from the cylinders through lines 295 and 296 via valve 294 and line 293 to line 282, since valve 294 provides free flow in the exhaust direction of arrow 303 retraction will be controlled by valve 301. If the cylinders are already retracted, of course, no action will be effected by actuation of solenoid 274.

When the solenoid 274 is de-energized, bias of spring 305 will move valve 277 to the position of Figure 24 establishing the datum circuit connections as previously described. Likewise spring 281 will cause valve 272 to center, establishing datum connections.

When solenoid 275 is energized, it will move valve 276 against the bias of spring 310, dis-establishing connection between lines 286 and 292 and establishing connection between lines 284 and 292 to apply pressure to cylinder 273 to move the valve 272 leftwardly against the bias of spring 280 in the direction of arrow 307. Fluid will be returned from cylinder 273 via lines 291, 287 and 290 to return line 282.

This movement of valve 272 against spring 280 will establish connection between lines 271 and 293 and 272 and 302. Pressure will thus be supplied through speed control valve 294 to lines 295 and 296 and to cylinders 56 to move them to extended or bending position. Fluid will be returned via lines 297 and 300 from cylinders 56 through valve 301 and line 302 to return line 282.

When solenoid 275 is de-energized, valve 276 under the bias of spring 310 and valve 272 under the bias of spring 280 will return to the position shown in Figure 24 breaking connections and re-establishing datum connections. Likewise spring 280 will cause valve 272 to center, establishing datum connections.

*Clamp cylinder*

Line 246 is also connected through a reducing valve 311 to line 312 which is provided with a valve 313 and pressure gauge 314.

Line 312 is connected by line 315 to a valve 316 which valve is connected by line 317 to return line 251. Valve 316 is a four-way two position control valve, double solenoid, and pilot operated. Valve 316 is controlled by the operation of a pilot cylinder 318 controlled by pilot valves 319 and 320 actuated by solenoids 321 and 322. Valve 316 is connected by lines 323 and 324 to clamping cylinders 175 which in this instance is shown as a single cylinder since cylinders 175 are manifolded together for operation.

Line 315 is connected via line 326 and lines 330 and 331 to valves 319 and 320 respectively. Valves 319 and 320 are connected via lines 332 and 333 to line 334 which is connected to return line 317. Cylinder 318 is connected by lines 327 and 328 to valves 320 and 319 respectively.

Thus, when the circuitry is in the datum or rest position of Figure 24, pressure is supplied via line 323 to maintain cylinder 175 in unclamped position, fluid discharging from cylinder 175 via line 324 through valve 316 to line 317 to return line 251. At this time pressure via lines 326, 330 and 331 is blocked off at valves 319 and 320. Lines 332 and 333 are connected to line 334 and lines 327 and 328 are connected to lines 332 and 333. Solenoid 322 when energized will move the valve 320 against the bias of spring 340 to connect line 331 to line 327 to move the piston of cylinder 318 rightwardly and to extended position, moving valve 316 in the direction of arrow 325 to connect lines 317 and 323 to move cylinder 175 to clamping position. Fluid is returned from cylinder 318 via lines 328, 333 and 334.

When solenoid 322 is de-energized, valve 320 under the bias of spring 340 returns to the position shown in Figure 24 and breaks the connection to re-establish datum connections. However, since valve 316 is not spring biased once pressure is relieved on cylinder 318 it will remain in the position established.

When solenoid 321 is energized pressure will be supplied via line 326, line 330 and line 328 to cylinder 318 to move valve 318 back to the position shown in Figure 24, and valve 316 in the direction of arrow 329 back to the position shown in Figure 24, cylinder 318 discharging via lines 327 and 334 to return line 317, in which position valve 316 will remain after solenoid 321 is de-energized and until solenoid 320 is again energized.

*Feed cylinder*

The line 312 is connected through line 340 to manually operated valve 341 which is connected by return line 342 to line 251. Valve 341 is a three-position manually operated four-way control valve, detent maintained. It is connected by line 343 through throttle valve 344 to feed cylinder 40 and by line 345 to cylinder 40. When in the datum or rest position of Figure 24 fluid return lines 340, 342, 343 and 345 are blocked at the valve.

When it is desired to feed tubes to the machines for bending, the valve 341 will be pushed in the direction of arrow 346 by actuation of handle 339 connecting lines 340 and 345 to apply pressure to the piston of cylinder 40 to move it leftwardly with reference to Figure 24 for bending action. At any time during such movement the valve may be returned to the datum or rest position of Figure 24 disestablishing such connections and retaining the piston of the feed cylinder in partially extended position. When it is desired to retract the piston of the feed cylinder, the valve is moved in direction of arrow 347 connecting lines 340 and 343, supplying pressure to move the piston rightwardly or to retract it with reference to Figure 24, exhausting fluid through lines 345 and 342 to line 255.

Likewise the valve may be returned to neutral at any time during the retraction so as to immobilize the piston in partially retracted position.

Figure 23:
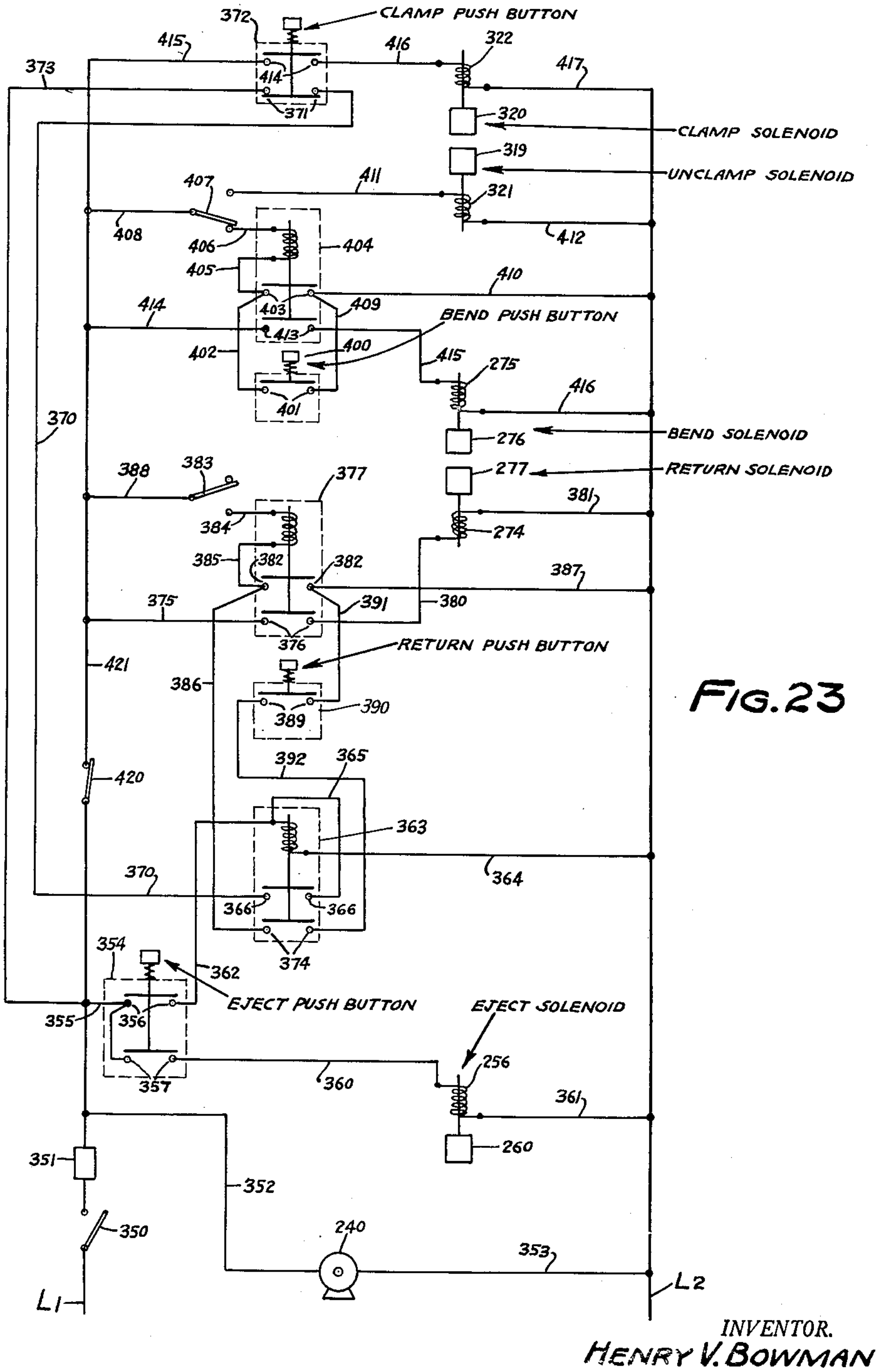
Figures 23 and 24 are circuit diagrams of the electrical and hydraulic controls.

Figure 23 is a schematic electrical wiring diagram showing the various electrical circuits. As shown in that figure, current is received from lines L1 and L2 of a suitable source. Line L1 is provided with a master switch 350 operable to energize and de-energize the entire circuit and a suitable fuse 351.

The motor 240 is connected via lines 352 and 353 to lines L1 and L2 respectively so that it is energized upon closure of switch 350. It is to be understood however that a separate switch may be provided for motor 240 and further it may be provided with a separate source of electric current as desired.

An eject push button 354 is connected to line L1 by line 355 which line connects to one of each pair of normally open contacts 356 and 357 respectively. The other of contacts 357 is connected to line 360 which is connected to eject valve solenoid 256 which is connected by line 361 to line L2. This solenoid controls the pilot valve 260. Thus, when contacts 357 are closed by actuation of button 354, solenoid 256 will be actuated to control the eject valve 253 through its pilot 260 to operate the eject cylinder 51 as explained with reference to the hydraulic circuit diagram, Figure 24.

The other of contacts 356 is connected via line 362 to the coil of relay 363 which is connected by line 364 to line L2. Thus, actuation of switch 354 will energize relay 363 at the same time it energizes solenoid 256.

Line 365 connects line 362 to one of a pair of normally open contacts 366; the other one of which is connected by line 370 to one of normally closed contacts 371 of clamping push button 372. The other contact 371 is connected by line 373 to line L1. Thus, when button 354 is pushed it energizes the coil of relay 363 which closes contacts 366 which provides a holding circuit for the relay so long as contacts 371 are closed. When button 372 is actuated relay 363 will drop out.

Relay 363 is also provided with a pair of normally open contacts 374 one of which is connected by line 386 to one of contacts 382 of relay 377 and the other of contacts 374 is connected by line 392 to one of the normally opened contacts 389 of a return push button switch 390, the other contact 389 of which is connected via line 391 to the other of contacts 382 of relay 377 and also via line 387 to line L2.

Thus, when relay 363 is energized, a circuit is conditioned to be established from line L1 via line 388 and the normally open contacts of limit switch 383 (see Figures 1 and 23) and via line 384 through the coil of relay 377 thence via line 385 to one of contacts 382 and thence via line 386 to contacts 374 and via line 392 to push button 390 and via line 391, and line 387 to line L2. The circuit is conditioned for completion upon closing of normally open contacts 389 by the pushing of button 390, which circuit will be established if normally open limit switch 383 is closed but will not if it is open. Upon such establishment, a holding circuit will be established through the contacts 382 of relay 377 and said relay will remain energized.

Upon the energization of relay 377 a circuit is established from line L1 via line 375, normally open contacts 376 and line 380 to solenoid 274 and via line 381 to line L2. Energization of solenoid 274 controls pilot valve 277 as previously explained with reference to the hydraulic diagram, to return bend cylinders 56 to the position of Figure 24. Thus, when limit switch 383 has its contacts in normally closed position of Figure 23 and button 390 is energized, the solenoid 274 will be energized to move valve 277 to return the bending apron if it is in elevated or engaged position.

A push button switch 400 for actuating the bending apron to elevated or bending position is provided with a pair of normally opened contacts 401 one of which is connected by a line 402 through one of normally opened contacts 403 of relay 404 to line 405 and through the relay coil via line 406 and normally closed limit switch 407 (see Fig. 1) via line 408 to L1.

The other of contacts 401 is connected to line 409 in turn connected to the other of contacts 403 and via line 410 to line L2.

Thus, when the throw of switch 407 is in the normal position to connect lines 408 and 406 and button 400 is pushed to close contacts 401 a circuit to relay 404 is completed. The energization of relay 404 closes contacts 403 so that when the push button 400 is released, a holding circuit will be established through contacts 403, and relay 404 will remain in energized position so long as the throw of switch 407 connects lines 408 and 406. When the throw of limit switch 407 connects instead lines 408 and 411 relay 404 cannot be energized and a circuit is established to the coil of solenoid 321 and via line 412 to line L2. Energization of solenoid 321 moves the clamp cylinders 175 through pilot 319 to the unclamped position. Thus, the bending apron cannot be actuated when the tubes are unclamped.

When relay 404 is energized it closes normally open contacts 413 which via lines 414, 415 and 416 energizes solenoid 275 to actuate pilot 276 to bend the tubes.

Switch 372 is also provide with a pair of normally open contacts 414 connected by line 415 to line L1 and line 416 to the solenoid 322 which is connected by line 417 to line L2. Energization of solenoid 322 actuates pilot valve 320 and cylinders 175 to move them to the clamping position. The solenoid is actuated upon energization of switch 372 which serves to complete the circuit to actuate solenoid 322 and interrupt the circuit to relay 363 dropping out relay 363 by opening contacts 371.

Switch 407 is a limit switch which is normally in the position shown in Figure 23 and is positioned to be engaged by cam lug 47 (see Fig. 3) on member 133 when it has rotated 180 degrees, i.e. the apron 54 is in bending position and has bent the tubes, to throw 407 to connect lines 408 and 411 to energize solenoid 321 to unclamp the tubes.

Limit switch 383 is normally engaged by cam lug 48 and maintained in open position but when cam lug 48 disengages from switch 383 as the bending apron commences rotation it closes to permit energization of relay 377.

Limit switch 420 is secured to bed portion 32A and controlled by the movement of the piston of eject cylinder 51 and as the piston moves to eject tubes, from left to right with reference to Figures 24, 3 and 1, it opens when coupler 53 moves away from switch 420, precluding energization of any circuit except that to the eject solenoid 256, and the holding circuit to relay 363.

The sequence of operation is as follows:

At the start of the cycle, limit switch 407 is in the position shown; limit switch 383 is held open; limit switch 420 is closed; relay 363 is open if the machine has been turned on prior to actuation and is closed if a previous cycle has just been completed. Relays 377 and 404 are open.

Clamp button 372 is pushed momentarily to engage clamp solenoid 322 to drop out relay 363 if it is energized.

Bend push button 400 is actuated to energize relay 404 which energizes bend solenoid 275.

As the apron 54 rotates counterclockwise with reference to Figure 1 or to elevated position, cam 48 leaves limit switch 383 and limit switch 383 moves to connect lines 388 and 384 to condition the return cycle.

When the apron 54 has rotated 180 degrees, cam 47 hits limit switch 407 and reverses its position to connect lines 408 and 411, automatically to energize the unclamping solenoid 321 at the same time disconnecting lines 408 and 406. When these lines are disconnected relay 404 drops out to de-energize the bending solenoid prior to the de-energization of the clamping solenoid 322.

The eject push button 354 is then actuated to energize eject solenoid 256. As the piston of eject cylinder 51 moves from left to right with reference to Figures 1 and 24, limit switch 420 opens all the circuits except that to the eject push button 354, the eject solenoid 256 and relay 363.

Release of button 354 after ejection retracts the piston of cylinder 51, which when it is completely retracted engages limit switch 420 and switch 420 closes.

When button 354 is energized the circuit to relay 363 is closed and held closed to condition the circuit to push button 390 for completion so that the bending apron 54 may be returned. Actuation of push button 390 will energize relay 377 and also return solenoid 274. As the bending apron 54 rotates clockwise, cam 47 leaves limit switch 407 moving this switch to its normal position of Figure 23 to disconnect lines 408 and 411 and de-energize unclamping solenoid 321 and to connect lines 408 and 406 to condition the circuit to relay 404 to set up the next bending cycle.

When apron 54 has rotated 180 degrees, cam 48 energizes limit switch 383 causing it to open to drop out relay 377 and de-energize return solenoid 274.

The cycle is then complete.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A tube bending machine comprising means for supporting a tube in horizontal extension, means adapted to engage a tube for translation thereof to a bending station and underneath an external mandrel, supporting means positioning said tube at said bending station under said external mandrel, separate clamping means for engaging a portion of said tube adjacent said external mandrel and at one side thereof, means for rotating said clamping means to bend said tube about said mandrel, and means for translating said external mandrel in a direction to exert force against the inner arc of the bend produced in the tube for removing the tube from communication with the clamping means.

2. A tube bending machine comprising a frame upon which is supported a two part bed providing a feed end and a bending end, the two parts being separated, said feed end comprising a loading table having a plurality of spaced grooves, said bending end comprising plurality of bending dies and a rotary bending member, a loading means reciprocable on said loading table and having projections adapted to engage the ends of tubes for the centering and loading thereof, said bending means including a plurality of extending mandrel rods secured at their distal end and unsecured at the end proximal to said bending member, said rods adjacent said bending member each being provided with a rounded surface about which a tube may be bent, adjustable means for limiting the penetration of said rods in the said tubes, an external mandrel having ends rotatably supported in bearing block means, and positioned between said bending member and the rounded surfaces of said rods, said bending dies comprising a front die positioned adjacent said loading end and carried by said bending member and a rear die positioned on the other side of said external mandrel, said dies being provided with aligned guide recesses and said external mandrel being grooved in cooperation therewith, said bending member including a clamping means positioned adjacent said front die for clamping the tube securely therebetween, a pair of rack bars positioned in spaced relation for simultaneous movement, each engaging a spur gear for actuating said bending member and eject means for movement of said external mandrel for ejecting said tubes from said bending end after bending.

3. In a tube bending machine, a planar loading table having a plurality of elongated parallel grooves extending therein, pusher means having cooperating projections adapted to be positioned one in each of said grooves, each of said cooperating projections carrying a centering device adapted to center one end of a hollow tube thereon, means adapted to move said pusher means from index position on said table to extended position to translate tubes and back to index position, a shelf means adapted to form a prolongation of said table, said shelf means pivoted to said table at one end and normally in decline position with respect thereto and means for securing said shelf to the bending means whereby as said bending means is moved from the bending of a tube, said shelf is moved from said declined to said prolongation position.

4. The structure of claim 3 in which said shelf is provided with a stop means movable from elevated to retracted position, and bias means normally maintaining said stop means in elevated position.

5. The structure of claim 4 further characterized by flexible means connecting each side of said shelf means to said bending means.

6. In a tube bending machine having means for translating tubes from loading to bending position, means for clamping said tubes, means for bending said tubes, and means for returning said tubes from bending to loading position, the improvement comprising electro-mechanical control means precluding actuation of said loading, bending and clamping means after actuation of said means for returning said tubes.

7. The structure of claim 6 further characterized by means actuated by rotation of said bending means for automatically unclamping said tubes.

8. In a tube bending machine, a bending end comprising a pair of spaced bearing supports, said bearing supports each having journalled therein a trunnion to which is secured a bending member adapted normally to rest at one side thereof, said trunnions being connected through said bending member, each of said trunnions having a member adapted for cooperation with an end of an external mandrel, said external mandrel positioned therebetween and having ends likewise adapted to cooperate with the ends of said trunnions, said ends being removable from said cooperating trunnion ends when said bending member is in normal position or in rotated position of substantially 180 degrees, each of said trunnions carrying a spur gear, racks positioned for rotation thereof, said bending member carrying a first bending die and a clamping means cooperable therewith for clamping tubes thereagainst, a second bending die positioned on the other side of said external mandrel, a plurality of internal mandrel rods each adapted to receive a tube thereon positioned in cooperation with said second bending die and having an end terminating adjacent the bottom of said external mandrel, adjustable stop means for determining the penetration of tubes on said rods, and means extendable from retracted to extending position for moving said external mandrel from its position adjacent the ends of said internal mandrel to a remote position for removing tubes therefrom.

9. The structure of claim 8 further characterized by a planar member normally positioned in retracted position and having means connected to said bending member for being drawn into elevated position as said bending member rotates 180 degrees to provide a support for said bent rods as they are removed by translation of said external mandrel, said planar member having elevatable tube stops normally biased to elevated position.

10. A bending head for a tube bending machine comprising in combination a first and second spaced rotary means, a clamping means secured thereto and supported by said first and secondary rotary means for rotation therewith, means for simultaneously rotating each of said first and second rotary means, mandrel means with a cooperative means where it may be engaged with said first and second rotary means for rotation therewith and means whereby it may be disengaged therefrom and a cam secured to one of said rotary means for rotation therewith for initiating the release of said clamping means at a predetermined rotated position.

11. In a tube bending machine, a bending member including means for clamping a tube securely therein, said bending member positioned for rotation about a horizontal axis, an external mandrel about which said tube is bent during rotation, said bending member being supported by spaced trunnions, said external mandrel being journalled for rotation simultaneously with the rotation of said spaced trunnions, said external mandrel being removably connected to said spaced trunnions and means for removing said external mandrel from said trunnions and means engaging the surface of said external mandrel for preventing vertical movement thereof as said tubes are bent therearound.

12. A tube bending machine comprising means for supporting a tube in horizontal extension, an external mandrel journalled for rotation about a horizontal axis and positioned centrally within said machine, clamping means for engaging a portion of said tube adjacent said external mandrel and at one side thereof, means for rotating said external mandrel and said clamping means in unison about said horizontal axis, means for translating said external mandrel in a direction to exert force against the inner arc of the bend produced in the tube for removing the tube from communication with the clamping means comprising a reciprocal member movable from first retracted to second extended position and means operable as said tube is removed from said clamping means to provide a detent for precluding reverse translation of said tube as said member is moved from second to first position.

13. A tube bending machine comprising means for supporting a tube in horizontal extension, means adapted to engage a tube for translation thereof to a bending station and underneath an external mandrel, supporting means positioning said tube at said bending station under said external mandrel, clamping means for engaging a portion of said tube adjacent said external mandrel and at one side thereof, means for rotating said clamping means to bend said tube about said mandrel, means for translating said external mandrel in a direction to exert force against the inner arc of the bend produced in the tube for removing the tube from communication with the clamping means, said means for translating said external mandrel comprising a reciprocal member movable from first retracted to second extended position and means operable as said tube is removed from said clamping means to provide a detent for precluding reverse translation of said tube as said member is moved from second to first position.

14. In a tube bending machine having a loading table spaced from an external mandrel, and a bending means journalled to move from a first position to a second position therebetween, said bending means when in said first position comprising a prolongation of said loading table and when in said second position moved upwardly out of the plane thereof and in which said mandrel is movable toward said loading table when said bending means is in said second position, the improvement comprising a planar member journalled to said loading table and adapted to form a continuation thereof to close the space between said loading table and said mandrel when said bending means is in said second position.

15. The structure of claim 14 in which said planar member is provided with depressible projecting means extending upwardly from the surface thereof.

16. In a tube bending machine, a bending end comprising a pair of spaced bearing supports, said bearing supports each having journalled therein a trunnion to which is secured a bending member adapted normally to rest at one side thereof, said trunnions being connected through said bending member, each of said trunnions having an end adapted to receive an end of an external mandrel, an external mandrel releasably secured between said ends of said trunnions, said external mandrel ends being removable from said cooperating trunnion ends when said bending member is in a predetermined position, means for rotating said trunnions, said bending member carrying clamping means for securing tubes, and means extendable from retracted to extended position for moving said external mandrel from its position in cooperation with said trunnion ends to a remote position.

References Cited in the file of this patent

UNITED STATES PATENTS

| | | |
|---|---|---|
| 360,288 | Follett | Mar. 29, 1887 |
| 799,670 | Reynolds | Sept. 19, 1905 |
| 816,917 | Keene | Apr. 3, 1906 |
| 849,571 | Reynolds | Apr. 9, 1907 |
| 1,238,941 | Reynders | Sept. 4, 1917 |
| 1,453,203 | Stiefel | Apr. 24, 1923 |
| 1,619,951 | Melville | Mar. 8, 1927 |
| 1,744,391 | Kuehn | Jan. 21, 1930 |
| 1,754,635 | McCarthy | Apr. 15, 1930 |
| 1,826,403 | O'Brien | Oct. 6, 1931 |
| 1,901,897 | Clayton | Mar. 21, 1933 |
| 2,023,738 | Mason | Dec. 10, 1935 |

(Other references on following page)

UNITED STATES PATENTS

| | | |
|---|---|---|
| 2,126,235 | Wesley | Aug. 9, 1938 |
| 2,235,072 | Irving | Mar. 18, 1941 |
| 2,336,524 | Bannister | Dec. 14, 1943 |
| 2,357,812 | Duer | Sept. 12, 1944 |
| 2,369,260 | Slater | Feb. 13, 1945 |
| 2,453,868 | Shaw | Nov. 16, 1948 |
| 2,466,909 | Periman | Apr. 12, 1949 |
| 2,482,617 | Green | Sept. 20, 1949 |
| 2,488,896 | Bertolini | Nov. 22, 1949 |
| 2,583,479 | Froedge | Jan. 22, 1952 |
| 2,655,193 | Payne | Oct. 13, 1953 |
| 2,682,694 | Kempkes | July 6, 1954 |
| 2,819,790 | Calmes | Jan. 14, 1958 |

FOREIGN PATENTS

| | | |
|---|---|---|
| 18,199 | Great Britain | Nov. 12, 1890 |
| 51,426 | Austria | Dec. 27, 1911 |